US012578667B2

(12) United States Patent
Saito et al.

(10) Patent No.: US 12,578,667 B2
(45) Date of Patent: Mar. 17, 2026

(54) CHARGING ROLL FOR ELECTROPHOTOGRAPHIC MACHINE

(71) Applicant: Sumitomo Riko Company Limited, Aichi (JP)

(72) Inventors: Yoshihiro Saito, Aichi (JP); Junichiro Suenaga, Aichi (JP); Manami Murai, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 19/014,233

(22) Filed: Jan. 9, 2025

(65) Prior Publication Data

US 2025/0147446 A1 May 8, 2025

Related U.S. Application Data

(63) Continuation of application No. PCT/JP2023/024706, filed on Jul. 4, 2023.

(30) Foreign Application Priority Data

Aug. 11, 2022 (JP) ................................ 2022-128556

(51) Int. Cl.
*G03G 15/02* (2006.01)

(52) U.S. Cl.
CPC ................................ *G03G 15/0233* (2013.01)

(58) Field of Classification Search
CPC ....................... G03G 15/0233; G03G 15/0216
See application file for complete search history.

(56) References Cited

U.S. PATENT DOCUMENTS

2015/0125184 A1* 5/2015 Higaki ............... G03G 15/0233 399/176
2019/0025727 A1 1/2019 Oura et al.
2019/0346786 A1* 11/2019 Mori .................. G03G 15/0233
2023/0314980 A1 10/2023 Saito et al.

FOREIGN PATENT DOCUMENTS

JP 2022127132 8/2022
WO 2018025870 2/2018

OTHER PUBLICATIONS

"International Search Report (Form PCT/ISA/210) of PCT/JP2023/024706", mailed on Aug. 15, 2023, with English translation thereof, pp. 1-4.

* cited by examiner

*Primary Examiner* — Sandra Brase
(74) *Attorney, Agent, or Firm* — JCIPRNET

(57) ABSTRACT

In a charging roll, at least one groove extending in a direction within ±46° relative to a circumferential direction is regularly formed in an axial direction on an outer peripheral surface of an elastic body layer. The groove has a width of 4 to 30 μm and a depth of 2 to 12 μm. A planar part being a portion of the outer peripheral surface of the elastic body layer other than the groove has a width of 4 to 30 μm. A specific relationship is present between an angle of the direction in which the groove extends relative to the circumferential direction and a ratio of the width of the groove to the width of the planar part. The surface layer includes a binder polymer and roughness forming particles. The roughness forming particles are respectively arranged on the planar part and the groove.

10 Claims, 3 Drawing Sheets

CHARGING ROLL FOR ELECTROPHOTOGRAPHIC MACHINE

CROSS-REFERENCE TO RELATED APPLICATION

This application is a continuation of PCT International Application No. PCT/JP2023/024706, filed on Jul. 4, 2023, which claims priority under 35 U.S.C § 119(a) to Japanese Patent Application No. 2022-128556, filed on Aug. 11, 2022. Each of the above application(s) is hereby expressly incorporated by reference, in its entirety, into the present application.

BACKGROUND

Technical Field

The present disclosure relates to a charging roll for an electrophotographic machine, which is suitably used in an electrophotographic machine such as a copier, a printer or a fax machine that employs electrophotography.

Related Art

There is known a charging roll of an electrophotographic machine which includes an elastic body layer having rubber elasticity on an outer peripheral surface of a shaft body such as a cored bar, and includes a surface layer on an outer peripheral surface of the elastic body layer. In the charging roll, in view of charging properties, for example, roughness forming particles may be added to a binder polymer of the surface layer.

However, since the roughness forming particles added to the surface layer are likely to aggregate, the uniformity in surface roughness is likely to deteriorate in a roughness forming method involving adding the roughness forming particles. In particular, if two or more types of roughness forming particles of different particle diameters are used to form surface irregularities, since the particles of different particle diameters aggregate separately, the uniformity in surface roughness is particularly likely to deteriorate. If the uniformity in surface roughness deteriorates, there is a risk that the uniformity in discharge properties of the charging roll may deteriorate.

SUMMARY

A charging roll for an electrophotographic machine according to the present disclosure includes: a shaft body; an elastic body layer, formed on an outer peripheral surface of the shaft body; and a surface layer, formed on an outer peripheral surface of the elastic body layer. One or two or more grooves extending in a direction within ±46° relative to a circumferential direction are regularly formed in an axial direction on the outer peripheral surface of the elastic body layer. The groove has a groove width w1 of 4 μm or more and 30 μm or less. The groove has a groove depth of 2 μm or more and 12 μm or less. A planar part being a portion of the outer peripheral surface of the elastic body layer other than the groove has a width w2 of 4 μm or more and 30 μm or less. An angle θ of the direction in which the groove extends relative to the circumferential direction and a ratio w2/w1 of the groove width w1 of the groove to the width w2 of the planar part has a relationship represented by relationships (A) to (C) below. The surface layer includes a binder polymer and roughness forming particles. The roughness forming particles are respectively arranged on the planar part and on the groove of the elastic body layer.

$$(A)\ \text{when } -5°\le\theta\le+5°, 0.7\le w2/w1\le 1.3;$$

$$(B)\ \text{when } -22°\le\theta<-5° \text{ or } +5°<\theta\le+22°, 1.0\le w2/w1\le 2.0;$$

$$(C)\ \text{when } -46°\le\theta<-22° \text{ or } +22°<\theta\le+46°, 1.2\le w2/w1\le 2.6.$$

DESCRIPTION OF THE EMBODIMENTS

Figure 1A:
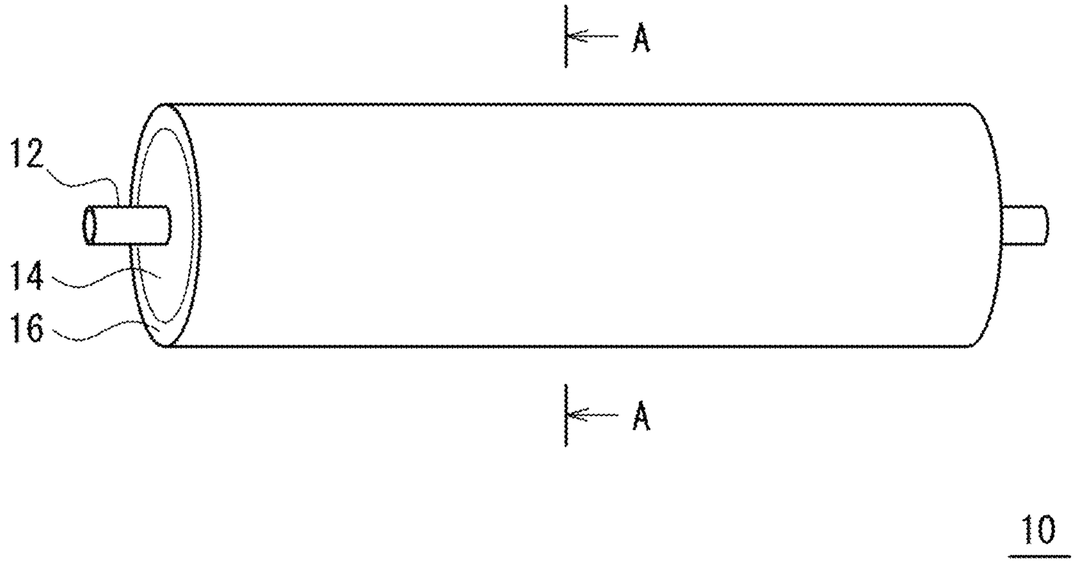
FIG. 1A is a schematic external view of a charging roll for an electrophotographic machine according to an embodiment of the present disclosure.

The present disclosure provides a charging roll for an electrophotographic machine that has excellent uniformity in discharge properties.

A charging roll for an electrophotographic machine according to the present disclosure includes: a shaft body; an elastic body layer, formed on an outer peripheral surface of the shaft body; and a surface layer, formed on an outer peripheral surface of the elastic body layer. One or two or more grooves extending in a direction within ±46° relative to a circumferential direction are regularly formed in an axial direction on the outer peripheral surface of the elastic body layer. The groove has a groove width w1 of 4 μm or more and 30 μm or less. The groove has a groove depth of 2 μm or more and 12 μm or less. A planar part being a portion of the outer peripheral surface of the elastic body layer other than the groove has a width w2 of 4 μm or more and 30 μm or less. An angle θ of the direction in which the groove extends relative to the circumferential direction and a ratio w2/w1 of the groove width w1 of the groove to the width w2 of the planar part has a relationship represented by relationships (A) to (C) below. The surface layer includes a binder polymer and roughness forming particles. The roughness forming particles are respectively arranged on the planar part and on the groove of the elastic body layer.

$$(A)\ \text{when } -5°\le\theta\le+5°, 0.7\le w2/w1\le 1.3;$$

$$(B)\ \text{when } -22°\le\theta<-5° \text{ or } +5°<\theta\le+22°, 1.0\le w2/w1\le 2.0;$$

$$(C)\ \text{when } -46°\le\theta<-22° \text{ or } +22°<\theta\le+46°, 1.2\le w2/w1\le 2.6.$$

The surface layer in an area on the groove may have a surface roughness Rz of 2 μm or more and 16 μm or less, and an entire surface layer may have a surface roughness Rz of 5 μm or more and 26 μm or less. The roughness forming particles may have an average particle diameter of 3 μm or more and 30 μm or less. A material of the roughness forming particles may be any one of polyurethane, polyamide, and acrylic resin. The binder polymer covering the roughness forming particles on the groove may have a larger thickness than the binder polymer covering the roughness forming particles on the planar part. A difference between the thickness of the binder polymer covering the roughness forming particles on the planar part and the thickness of the binder polymer covering the roughness forming particles on the groove may be 4 μm or more and 16 μm or less. The clastic body layer may contain one or more of isoprene rubber, nitrile rubber, and hydrin rubber. The binder polymer of the surface layer may be either polyurethane or polyamide. The roughness forming particles may be composed of a single type of particle. On the outer peripheral surface of the elastic body layer, a mesh-like groove may be formed in which a groove extending in a direction within +46° relative to the circumferential direction intersects a groove extending in a direction within −46° relative to the circumferential direction.

(1) A charging roll for an electrophotographic machine according to the present disclosure includes: a shaft body; an elastic body layer, formed on an outer peripheral surface of the shaft body; and a surface layer, formed on an outer peripheral surface of the elastic body layer. One or two or more grooves extending in a direction within ±46° relative to a circumferential direction are regularly formed in an axial direction on the outer peripheral surface of the elastic body layer. The groove has a groove width w1 of 4 μm or more and 30 μm or less. The groove has a groove depth of 2 μm or more and 12 μm or less. A planar part being a portion of the outer peripheral surface of the elastic body layer other than the groove has a width w2 of 4 μm or more and 30 μm or less. An angle θ of the direction in which the groove extends relative to the circumferential direction and a ratio w2/w1 of the groove width w1 of the groove to the width w2 of the planar part has a relationship represented by relationships (A) to (C) below. The surface layer includes a binder polymer and roughness forming particles. The roughness forming particles are respectively arranged on the planar part and on the groove of the elastic body layer.

$$(A)\ \text{when } -5°\leq\theta\leq+5°,\ 0.7\leq w2/w1\leq 1.3;$$

$$(B)\ \text{when } -22°\leq\theta<-5° \text{ or } +5°<\theta\leq+22°,\ 1.0\leq w2/w1\leq 2.0;$$

$$(C)\ \text{when } -46°\leq\theta<-22° \text{ or } +22°<\theta\leq+46°,\ 1.2\leq w2/w1\leq 2.6.$$

(2) In (1) above, the surface layer in an area on the groove may have a surface roughness Rz of 2 μm or more and 16 μm or less, and an entire surface layer may have a surface roughness Rz of 5 μm or more and 26 μm or less.

(3) In (1) or (2) above, the roughness forming particles may have an average particle diameter of 3 μm or more and 30 μm or less.

(4) In any one of (1) to (3) above, a material of the roughness forming particles may be any one of polyurethane, polyamide, and acrylic resin.

(5) In any one of (1) to (4) above, the binder polymer covering the roughness forming particles on the groove may have a larger thickness than the binder polymer covering the roughness forming particles on the planar part.

(6) In any one of (1) to (5) above, a difference between the thickness of the binder polymer covering the roughness forming particles on the planar part and the thickness of the binder polymer covering the roughness forming particles on the groove may be 4 μm or more and 16 μm or less.

(7) In any one of (1) to (6) above, the elastic body layer may contain one or more of isoprene rubber, nitrile rubber, and hydrin rubber.

(8) In any one of (1) to (7) above, the binder polymer of the surface layer may be either polyurethane or polyamide.

(9) In any one of (1) to (8) above, the roughness forming particles may be composed of a single type of particle.

(10) In any one of (1) to (9) above, on the outer peripheral surface of the elastic body layer, a mesh-like groove may be formed in which a groove extending in a direction within +46° relative to the circumferential direction intersects a groove extending in a direction within −46° relative to the circumferential direction.

According to the charging roll for an electrophotographic machine according to the present disclosure, the charging roll includes: a shaft body; an clastic body layer, formed on an outer peripheral surface of the shaft body; and a surface layer, formed on an outer peripheral surface of the clastic body layer. One or two or more grooves extending in a direction within ±46° relative to a circumferential direction are regularly formed in an axial direction on the outer peripheral surface of the elastic body layer. The groove has a groove width w1 of 4 μm or more and 30 μm or less. The groove has a groove depth of 2 μm or more and 12 μm or less. A planar part being a portion of the outer peripheral surface of the elastic body layer other than the groove has a width w2 of 4 μm or more and 30 μm or less. An angle θ of the direction in which the groove extends relative to the circumferential direction and a ratio w2/w1 of the groove width w1 of the groove to the width w2 of the planar part has a relationship represented by relationships (A) to (C) above. The surface layer includes a binder polymer and roughness forming particles. The roughness forming particles are respectively arranged on the planar part and on the groove of the clastic body layer. Accordingly, the charging roll has excellent uniformity in discharge properties.

When the surface layer in an area on the groove has a surface roughness Rz of 2 μm or more and 16 μm or less, and an entire surface layer has a surface roughness Rz of 5 μm or more and 26 μm or less, an appropriate discharge space and an appropriate discharge starting point can be formed between a photoreceptor and the charging roll.

When the roughness forming particles have an average particle diameter of 3 μm or more and 30 μm or less, appropriate irregularities are likely to be formed. Accordingly, the uniformity in discharge properties can be improved.

When a material of the roughness forming particles is any one of polyurethane, polyamide, and acrylic resin, since the roughness forming particles are composed of a material having a high dielectric constant, charging properties of a roll surface are improved.

When the binder polymer covering the roughness forming particles on the groove has a larger thickness than the binder polymer covering the roughness forming particles on the planar part, a discharge amount on the roughness forming particles on the groove and a discharge amount on the roughness forming particles on the planar part can be adjusted to be the same, and the uniformity in discharge properties can be improved.

When a difference between the thickness of the binder polymer covering the roughness forming particles on the planar part and the thickness of the binder polymer covering the roughness forming particles on the groove is 4 μm or more, the amount of charge on a surface of the binder polymer covering the roughness forming particles on the planar part relatively increases, and a range of environment in which an image with black spots is not generated is widened. When the above thickness difference is 16 μm or less, since an appropriate thickness is maintained, appropriate irregularities are likely to be formed. Accordingly, the uniformity in discharge properties can be improved.

When the clastic body layer contains one or more of isoprene rubber, nitrile rubber, and hydrin rubber, compression set is small, and generation of an image with stripes corresponding to a deformed part during setting of the charging roll is suppressed.

When the binder polymer of the surface layer is either polyurethane or polyamide, since the binder polymer is composed of a material having a high dielectric constant, charging properties of a roll surface are improved. The compression set is small, and generation of an image with stripes corresponding to a deformed part during setting of the charging roll is suppressed.

When the roughness forming particles are composed of a single type of particle, since an irregular shape of the clastic body layer is likely to be reflected on the surface irregularities of the charging roll, it is easy to control the surface irregularities of the charging roll. Since it is easy to control the aggregation of the roughness forming particles, the uniformity in surface roughness can be improved. Furthermore, since it is easy to adjust the thickness of the binder polymer covering the roughness forming particles, the uniformity in discharge properties can be improved.

When a mesh-like groove is formed in which a groove extending in a direction within +46° relative to the circumferential direction intersects a groove extending in a direction within −46° relative to the circumferential direction on the outer peripheral surface of the elastic body layer, the uniformity in surface roughness is improved. Accordingly, the uniformity in discharge properties can be improved.

Figure 1B:
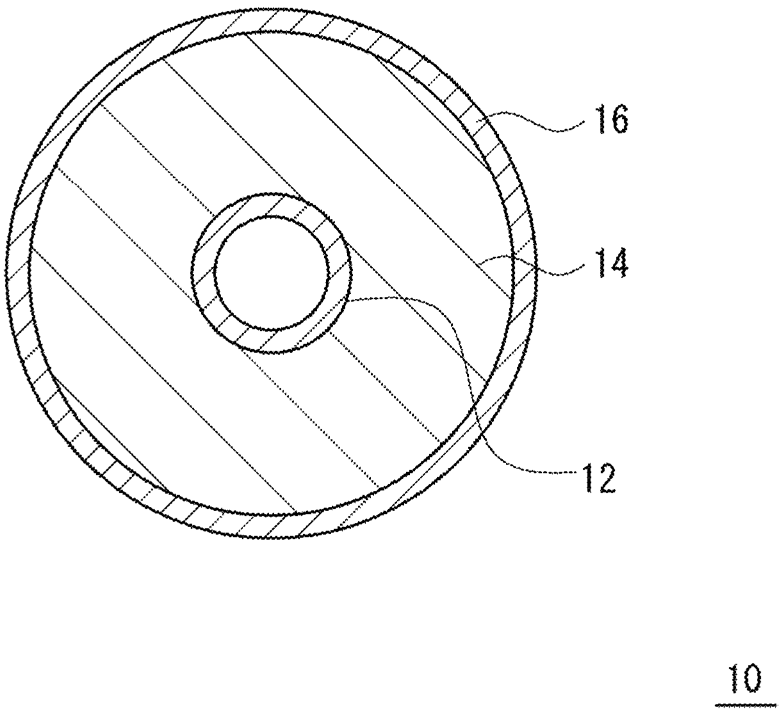
FIG. 1B is a cross-sectional view along line A-A in FIG. 1A.
Figure 2:
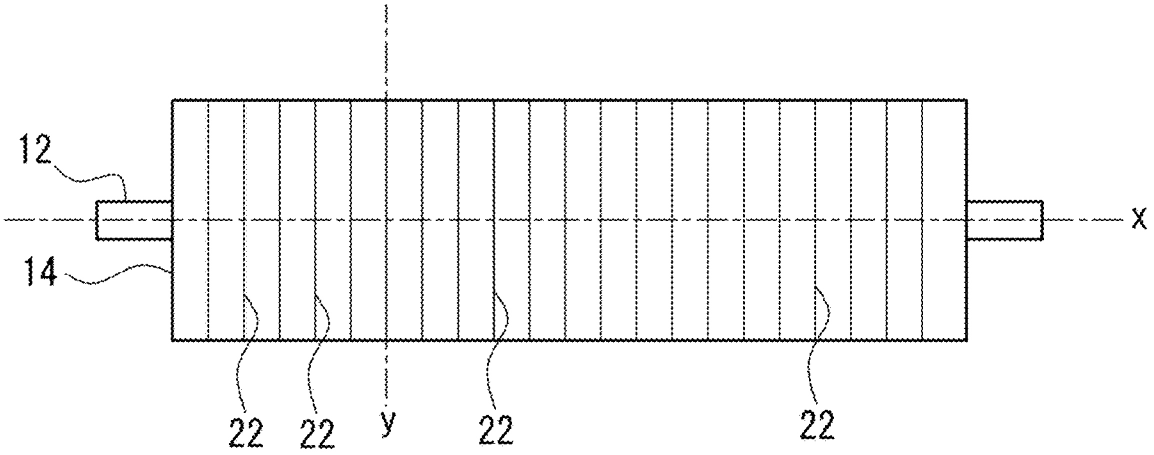
FIG. 2 is a schematic external view of an elastic body layer showing a shape of a groove formed on an outer peripheral surface of the elastic body layer.
Figure 3:
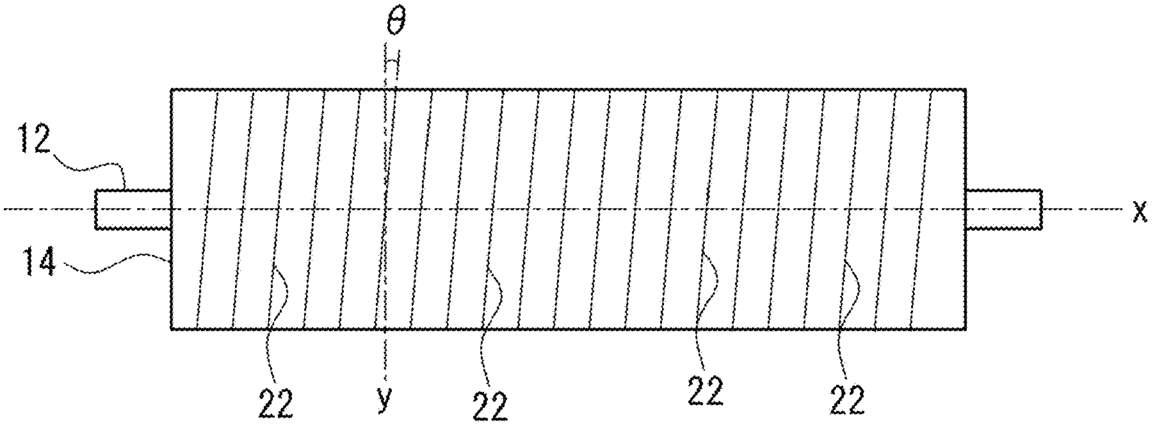
FIG. 3 is a schematic external view of the elastic body layer showing a modification of the shape of the groove formed on the outer peripheral surface of the elastic body layer.
Figure 4:
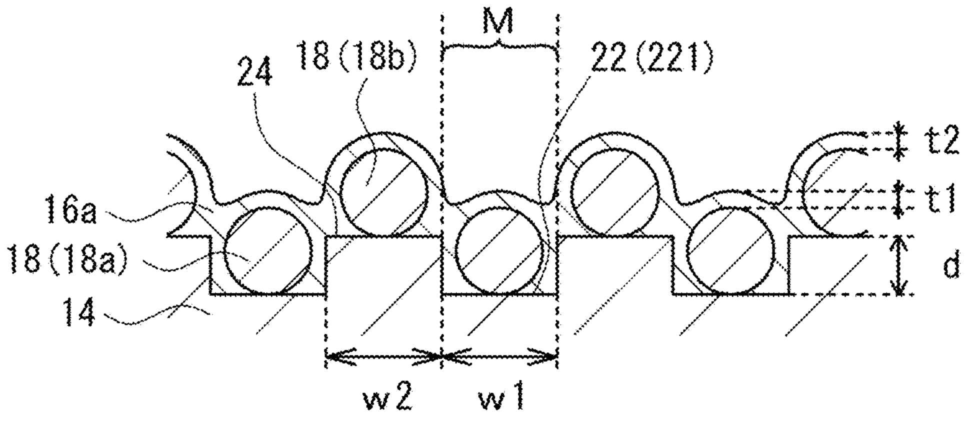
FIG. 4 is an enlarged cross-sectional view of a surface layer.

A charging roll for an electrophotographic machine (hereinafter sometimes simply referred to as charging roll) according to the present disclosure will be described in detail. FIG. 1A is a schematic external view of a charging roll for an electrophotographic machine according to an embodiment of the present disclosure, and FIG. 1B is a cross-sectional view along line A-A in FIG. 1A. FIG. 2 is a schematic external view of an elastic body layer showing a shape of a groove formed on an outer peripheral surface of the clastic body layer. FIG. 3 is a schematic external view of the clastic body layer showing a modification of the shape of the groove formed on the outer peripheral surface of the clastic body layer. FIG. 4 is an enlarged cross-sectional view of a surface layer.

A charging roll 10 includes a shaft body 12, an elastic body layer 14 formed on an outer peripheral surface of the shaft body 12, and a surface layer 16 formed on an outer peripheral surface of the clastic body layer 14. The clastic body layer 14 is a layer (base layer) serving as a base of the charging roll 10. The surface layer 16 is a layer that appears on a surface of the charging roll 10. Although not illustrated, an intermediate layer such as a resistance adjustment layer may be formed between the elastic body layer 14 and the surface layer 16 as needed.

The shaft body 12 is not particularly limited if it has conductivity. Specific examples of the shaft body 12 include a solid body made of metal such as iron, stainless steel, or aluminum, and a cored bar made of a hollow body. An adhesive, a primer or the like may be applied to a surface of the shaft body 12 as needed. That is, the elastic body layer 14 may be bonded to the shaft body 12 via an adhesive layer (primer layer). The adhesive, the primer or the like may be made conductive as needed.

In FIG. 2 and FIG. 3, x (direction) represents an axial direction of the charging roll 10, and y (direction) represents a circumferential direction of the charging roll 10. As shown in FIG. 2 and FIG. 3, one or two or more grooves 22 extending in a direction within ±46° relative to the circumferential direction y are regularly formed in the axial direction x on the outer peripheral surface of the clastic body layer 14. More specifically, two or more grooves 22 extending in a direction of 0° relative to the circumferential direction y (extending along the circumferential direction) are regularly formed in the axial direction x on the outer peripheral surface of the elastic body layer 14 in FIG. 2. In FIG. 2, one groove 22 circles around and is connected, and does not have a spiral shape. On the outer peripheral surface of the clastic body layer 14 in FIG. 3, one or two or more grooves 22 extending in a direction (direction of θ) within ±46° other than 0° relative to the circumferential direction y are regularly formed in the axial direction x. In FIG. 3, there are two or more grooves 22 that circle around and are connected and do not have a spiral shape. In FIG. 3, there is one groove 22 that has a spiral shape since it is connected throughout. The expression "regularly" refers to that the grooves 22 are formed at constant intervals in the axial direction x. On the outer peripheral surface of the elastic body layer 14, a portion other than the groove 22 is a planar part 24. As shown in FIG. 4, the planar part 24 protrudes radially outward of a bottom surface 221 of the groove 22. Due to the bottom surface 221 of the groove 22 arranged relatively radially inside and the planar part 24 arranged relatively radially outside, the elastic body layer 14 has surface irregularities formed on the outer peripheral surface. Since one or two or more grooves 22 extending in a direction within ±46° relative to the circumferential direction y are regularly formed in the axial direction x, uniform surface irregularities are formed on the outer peripheral surface of the elastic body layer 14. The expression "direction within ±46° relative to the circumferential direction y" refers to a direction within ranges of −46° to 0° and 0° to 46° relative to the circumferential direction y.

A reason for setting the direction in which the groove 22 extends to a direction within ±46° relative to the circumferential direction y is as follows. If an angle of the direction in which the groove 22 extends relative to the circumferential direction y increases (to have an absolute value of greater than 46)°, during friction between a photoreceptor and the charging roll 10, an edge of a convex part formed by the groove 22 is susceptible to shear stress in a rotation direction (circumferential direction y) of the charging roll 10, and the convex part is likely to be worn. When the convex part is worn, a difference in charging properties between the concave part and the convex part increases during durability testing, and an image with stripes is likely to be generated. When the lifespan of the electrophotographic machine extends and relatively high durability is required for the charging roll 10, the impact of the above wear is significant.

If the direction in which the groove 22 extends is set to a direction within ±46° relative to the circumferential direction y, when either a width of the convex part formed by the groove 22 or a width (groove width) of the groove 22 is excessively large, a charging difference between the convex part and the groove 22 within one rotation of the charging roll 10 is easy to notice, which is susceptible to uneven charging. Hence, a ratio of the width of the convex part to the width (groove width) of the groove 22 is set to a specific range and the effect of uneven charging is suppressed.

The groove 22 has a groove width w1 of 4 μm or more and 30 μm or less. The groove 22 has a groove depth d of 2 μm or more and 12 μm or less. The planar part 24 has a groove width w2 of 4 μm or more and 30 μm or less. A specific relationship is present between an angle θ of the direction in which the groove 22 extends relative to the circumferential direction y and a ratio w2/w1 of the groove width w1 of the groove 22 to the width w2 of the planar part 24.

If the groove width w1 of the groove 22 is less than 4 μm, the groove width w1 is excessively small, preventing the roughness forming particles 18 from entering the groove 22. Hence, a difference between the surface roughness Rz arising from roughness forming particles 18*b* on the planar part 24 and the surface roughness Rz arising from roughness forming particles 18*a* on the groove 22 decreases, and horizontal stripes occur due to insufficient charging. If the roughness forming particles 18 of a size that fits in a small groove width w1 are used, a roughness that ensures sufficient discharge cannot be formed. From this viewpoint, it is preferable to set the groove width w1 of the groove 22 to 5 μm or more, 10 μm or more, 20 μm or more or the like, in accordance with an average particle diameter of the roughness forming particles 18 being used.

If the groove width w1 of the groove 22 exceeds 30 μm, as mentioned above, an image defect (vertical stripes) is likely to occur. If the groove width w1 of the groove 22 exceeds 30 μm, the groove width w1 is excessively large, and the roughness forming particles 18 cannot be uniformly arranged in the groove 22. If the roughness forming particles 18 of a size that matches the large groove width w1 are used, a convex part due to the roughness forming particles 18 is excessively large, the surface roughness is excessively large, and an appropriate surface roughness cannot be achieved. Accordingly, uniform discharge properties cannot be achieved. If the groove width w1 is excessively large, since a binder polymer 16*a* covering the roughness forming particles 18 on the groove 22 is likely to contact the photoreceptor, not only the binder polymer 16*a* covering the roughness forming particles 18*b* on the planar part 24 and the roughness forming particles 18*b* thereunder but also the binder polymer 16*a* covering the roughness forming particles 18*a* on the groove 22 and the roughness forming particles 18*a* thereunder are worn, the entire surface of the surface layer 16 is worn during durability testing, and unevenness occurs in the image. From this viewpoint, it is preferable to set the groove width w1 of the groove 22 to 25 μm or less, 20 μm or less, 15 μm or less, 10 μm or less or the like, in accordance with the average particle diameter of the roughness forming particles 18 being used.

If the groove depth d of the groove 22 is less than 2 μm, the groove depth d is excessively small, the difference between the surface roughness Rz arising from the roughness forming particles 18*b* on the planar part 24 and the surface roughness Rz arising from the roughness forming particles 18*a* on the groove 22 is excessively small, and horizontal stripes occur due to insufficient charging. If small roughness forming particles 18 are used in accordance with a small groove depth d, a roughness that ensures sufficient discharge cannot be formed. From this viewpoint, it is preferable to set the groove depth d of the groove 22 to 3 μm or more, 5 μm or more, 10 μm or more or the like, in accordance with the average particle diameter of the roughness forming particles 18 being used.

If the groove depth d of the groove 22 exceeds 12 μm, the groove depth d is excessively large, making it impossible to form surface roughness on the groove 22 using the roughness forming particles 18 arranged in the groove 22. Hence, black spots (fogging) occur in an image after durability testing. If the groove depth d of the groove 22 exceeds 12 μm, the groove depth d is excessively large, the difference between the surface roughness Rz arising from the roughness forming particles 18*b* on the planar part 24 and the surface roughness Rz arising from the roughness forming particles 18*a* on the groove 22 is excessively large, and the difference in charging properties increases. Thus, an image defect (vertical stripes) is likely to occur. If large roughness forming particles 18 are used in accordance with a large groove depth d, the difference between the surface roughness Rz arising from the roughness forming particles 18*b* on the planar part 24 and the surface roughness Rz arising from the roughness forming particles 18*a* on the groove 22 is excessively large, making discharge difficult. From this viewpoint, it is preferable to set the groove depth d of the groove 22 to 10 μm or less, 8 μm or less or the like, in accordance with the average particle diameter of the roughness forming particles 18 being used.

A reason for setting the width w2 of the planar part 24 to 4 μm or more and 30 μm or less similarly to the groove width w1 of the groove 22 is to make the width w2 within the same range as the groove width w1 of the groove 22 to thereby ensure uniform charging properties. In accordance with the groove width w1 of the groove 22, the width w2 of the planar part 24 is more preferably 5 μm or more, 10 μm or more, 20 μm or more, 25 μm or less, 20 μm or less, 15 μm or less, 10 μm or less, or the like.

A relationship between the angle θ of the direction in which the groove 22 extends and the width ratio w2/w1 is represented by relationships (A) to (C) below. Due to the following relationships, the generation of an image with stripes due to wear of the convex part (planar part 24) formed by the groove 22 or uneven charging caused by the charging difference between the convex part and the groove 22 within one rotation of the charging roll 10 is suppressed.

(*A*) when $-5° \leq \theta \leq +5°$, $0.7 \leq w2/w1 \leq 1.3$;

(*B*) when $-22° \leq \theta < -5°$ or $+5° < \theta \leq +22°$, $1.0 \leq w2/w1 \leq 2.0$;

(*C*) when $-46° \leq \theta < -22°$ or $+22° < \theta \leq +46°$, $1.2 \leq w2/w1 \leq 2.6$.

An angle of the groove 22 is calculated from the average of the angles relative to the circumferential direction y of 100 grooves 22 observed in an image captured by photographing the outer peripheral surface of the elastic body layer 14 using a laser microscope. The groove width w1 of the groove 22 is calculated from the average of the groove widths w1 of 100 grooves 22 observed in an image captured by photographing the outer peripheral surface of the elastic body layer 14 using a laser microscope. The groove depth d of the groove 22 is calculated from the average of the groove depths d of 100 grooves 22 observed in an image captured by photographing a cross section in the radial direction of the elastic body layer 14 using a laser microscope. The groove width w2 of the planar part 24 is calculated from the average of the widths w2 of 100 planar parts 24 observed in an image captured by photographing the outer peripheral surface of the elastic body layer 14 using a laser microscope.

The elastic body layer 14 contains crosslinked rubber. The elastic body layer 14 is formed from a conductive rubber composition containing uncrosslinked rubber. The crosslinked rubber is obtained by crosslinking uncrosslinked rubber. The uncrosslinked rubber may be either polar rubber or non-polar rubber.

Polar rubber is rubber having a polar group, and examples of the polar group include chloro group, nitrile group, carboxyl group, and epoxy group. Specific examples of the polar rubber include hydrin rubber, nitrile rubber (NBR), urethane rubber (U), acrylic rubber (copolymer of acrylic acid ester and 2-chloroethyl vinyl ether; ACM), chloroprene rubber (CR), and epoxidized natural rubber (ENR). Among the polar rubbers, hydrin rubber and nitrile rubber (NBR) are preferable from the viewpoint of being particularly likely to achieve low volume resistivity.

Examples of the hydrin rubber include an epichlorohydrin homopolymer (CO), an cpichlorohydrin-ethylene oxide binary copolymer (ECO), an epichlorohydrin-allyl glycidyl ether binary copolymer (GCO), and an epichlorohydrin-ethylene oxide-allyl glycidyl ether ternary copolymer (GECO).

Examples of the urethane rubber include a polyether-type urethane rubber having an ether bond in a molecule. The polyether-type urethane rubber can be produced by a reaction of diisocyanate and polyether having a hydroxyl group at both terminals. The polyether is not particularly limited, and examples thereof include polyethylene glycol and polypropylene glycol. The diisocyanate is not particularly limited, and examples thereof include tolylene diisocyanate and diphenylmethane diisocyanate.

Examples of the non-polar rubber include silicone rubber (Q), isoprene rubber (IR), natural rubber (NR), styrene-butadiene rubber (SBR), and butadiene rubber (BR). Among the non-polar rubbers, silicone rubber is preferable from the viewpoint of having low hardness and resistance to settling (excellent elastic recovery).

The elastic body layer 14 may contain one or more of isoprene rubber, nitrile rubber, and hydrin rubber. When the elastic body layer 14 contains one or more of isoprene rubber, nitrile rubber, and hydrin rubber, compression set is small, and generation of an image with stripes corresponding to a deformed part during setting of the charging roll 10 is suppressed.

Examples of a crosslinking agent include a sulfur crosslinking agent, a peroxide crosslinking agent, and a dechlorination crosslinking agent. These crosslinking agents may be used alone or as a combination of two or more crosslinking agents.

Examples of the sulfur crosslinking agent include a conventionally known sulfur crosslinking agent, such as powdered sulfur, precipitated sulfur, colloidal sulfur, surface-treated sulfur, insoluble sulfur, sulfur chloride, a thiuram-based vulcanization accelerator, and a polymeric polysulfide.

Examples of the peroxide crosslinking agent include a conventionally known peroxide crosslinking agent, such as a peroxyketal, a dialkyl peroxide, a peroxy ester, a ketone peroxide, peroxydicarbonate, a diacyl peroxide, and a hydroperoxide.

Examples of the dechlorination crosslinking agent include a dithiocarbonate compound. Specific examples include quinoxaline-2,3-dithiocarbonate, 6-methylquinoxaline-2,3-dithiocarbonate, 6-isopropylquinoxaline-2,3-dithiocarbonate, and 5,8-dimethylquinoxaline-2,3-dithiocarbonate.

From the viewpoint of resistance to bleeding or the like, the amount of the crosslinking agent blended is preferably within a range of 0.1 to 2 parts by mass, more preferably within a range of 0.3 to 1.8 parts by mass, and even more preferably within a range of 0.5 to 1.5 parts by mass, with respect to 100 parts by mass of the uncrosslinked rubber.

In the case of using a dechlorination crosslinking agent as the crosslinking agent, a dechlorination crosslinking accelerator may be used in combination. Examples of the dechlorination crosslinking accelerator include 1,8-diazabicyclo(5,4,0) undecene-7 (hereinafter abbreviated as DBU) or a weak acid salt thereof. The dechlorination crosslinking accelerator may be used in the form of DBU, and is preferably used in the form of a weak acid salt thereof from the viewpoint of handling. Examples of weak acid salts of DBU include carbonate, stearate, 2-ethylhexylate, benzoate, salicylate, 3-hydroxy-2-naphthoate, a phenol resin salt, a 2-mercaptobenzothiazole salt, and a 2-mercaptobenzimidazole salt.

From the viewpoint of resistance to bleeding or the like, the content of the dechlorination crosslinking accelerator is preferably within a range of 0.1 to 2 parts by mass with respect to 100 parts by mass of the uncrosslinked rubber. The content is more preferably within a range of 0.3 to 1.8 parts by mass, even more preferably within a range of 0.5 to 1.5 parts by mass.

A conductive agent can be blended into the clastic body layer 14 to impart conductivity. Examples of the conductive agent include an electronic conductive agent and an ionic conductive agent. Examples of the electronic conductive agent include carbon black, graphite, and conductive metal oxide. Examples of the conductive metal oxide include conductive titanium oxide, conductive zinc oxide, and conductive tin oxide. Examples of the ionic conductive agent include quaternary ammonium salt, borate, and a surfactant. Various additives may be appropriately added to the elastic body layer 14 as needed. Examples of the additives include a lubricant, a vulcanization accelerator, an anti-aging agent, a light stabilizer, a viscosity modifier, a processing aid, a flame retardant, a plasticizer, a foaming agent, a filler, a dispersant, a defoamer, a pigment, and a mold release agent.

The elastic body layer 14 can be adjusted to have a predetermined volume resistivity according to the type of the crosslinked rubber, the amount of the ionic conductive agent blended, the blending of the electronic conductive agent, or the like. The volume resistivity of the elastic body layer 14 may be appropriately set to a range of $10^2$ to $10^{10}$ Ω·cm, $10^3$ to $10^9$ Ω·cm, $10^4$ to $10^8$ Ω·cm, or the like, according to applications or the like.

A thickness of the clastic body layer 14 is not particularly limited, and may be appropriately set within a range of 0.1 to 10 mm, according to applications or the like.

The surface layer 16 includes the binder polymer 16*a* and the roughness forming particles 18.

The binder polymer 16*a* is a base polymer that constitutes the surface layer 16. Examples of the binder polymer 16*a* include urethane resin, polyamide resin, acrylic resin, acrylic silicone resin, butyral resin (PVB), alkyd resin, polyester resin, fluororubber, fluororesin, a mixture of fluororubber and fluororesin, silicone resin, silicone-grafted acrylic polymer, acrylic-grafted silicone polymer, nitrile rubber, and urethane rubber.

The binder polymer 16*a* is preferably either polyurethane or polyamide. When the binder polymer 16*a* of the surface layer 16 is either polyurethane or polyamide, since the binder polymer 16*a* is composed of a material having a high dielectric constant, charging properties of a roll surface are improved. The compression set is small, and generation of an image with stripes corresponding to a deformed part during setting of the charging roll 10 is suppressed. The polyurethane includes urethane resin, urethane rubber, and urethane elastomer. The polyamide may be modified.

Examples of the modified polyamide include an alkoxylated polyamide such as N-methoxymethylated nylon.

The roughness forming particle 18 is a particle for imparting roughness to the surface of the surface layer 16. That is, the roughness forming particle 18 is a particle for imparting irregularities to the surface of the surface layer 16. As shown in FIG. 4, the roughness forming particles 18 are respectively arranged on the planar part 24 and the groove 22 of the elastic body layer 14. Due to a step difference between the planar part 24 and the bottom surface 221 of the groove 22 of the clastic body layer 14, the roughness forming particles 18*b* on the planar part 24 (roughness forming particles 18*b* arranged on the planar part 24) and the roughness forming particles 18*a* on the groove 22 (roughness forming particles 18*a* arranged on the groove 22) exhibit different degrees of protrusion toward the radially outer side while having the same particle diameter. Due to the step difference between the planar part 24 and the bottom surface 221 of the groove 22 of the elastic body layer 14, the roughness forming particles 18*b* on the planar part 24 protrude radially outward of the roughness forming particles 18*a* on the groove 22.

The convex part due to the roughness forming particles 18*b* on the planar part 24, which protrudes relatively radially outward, serves as a portion that comes into contact with the photoreceptor. The convex part due to the roughness forming particles 18*a* on the groove 22, which is located relatively radially inside, serves as a portion that does not contact the photoreceptor. The convex part due to the roughness forming particles 18*a* on the groove 22 serves as a discharge starting point. Since the surface layer 16 includes the roughness forming particles 18*b* on the planar part 24, an appropriate discharge space is ensured between the photoreceptor and the charging roll 10. Since the surface layer 16 includes the roughness forming particles 18*a* on the groove 22, the discharge starting point is ensured. In this way, the surface irregularities of the surface layer 16 increase the discharge space between the photoreceptor and the charging roll 10 and promote discharge. Accordingly, charging properties can be improved, and an image defect such as horizontal stripes or unevenness can be reduced. In the charging roll 10 according to the present disclosure, due to the step difference between the planar part 24 and the bottom surface 221 of the groove 22 of the clastic body layer 14, even if the roughness forming particles 18 included in the surface layer 16 have the same particle diameter, it is easy to form an appropriate discharge space and an appropriate discharge starting point between the photoreceptor and the charging roll 10.

The surface roughness Rz of the surface layer 16 in an area M on the groove 22 is preferably 2 μm or more and 16 μm or less. The surface roughness Rz of the entire surface layer 16 is preferably 5 μm or more and 26 μm or less. Accordingly, an appropriate discharge space and an appropriate discharge starting point can be formed between the photoreceptor and the charging roll 10.

If the surface roughness Rz of the surface layer 16 in the area M on the groove 22 is less than 2 μm, the surface roughness Rz is excessively small, the discharge starting point is insufficient, discharge is insufficient, and black spots (fogging) sometimes cannot be suppressed in the image after durability testing. From this viewpoint, the surface roughness Rz is more preferably 3 μm or more, even more preferably 5 μm or more. On the other hand, if the surface roughness Rz of the surface layer 16 in the area M on the groove 22 exceeds 16 μm, the surface roughness Rz of the entire surface layer 16 is excessively large, making discharge difficult, and black spots (fogging) sometimes cannot be suppressed in the image after durability testing. From this viewpoint, the surface roughness Rz is more preferably 15 μm or less, even more preferably 12 μm or less.

If the surface roughness Rz of the entire surface layer 16 is less than 5 μm, the surface roughness Rz is excessively small, the discharge starting point is insufficient, discharge is insufficient, and black spots (fogging) sometimes cannot be suppressed in the image after durability testing. From this viewpoint, the surface roughness Rz is more preferably 7 μm or more, even more preferably 10 μm or more. On the other hand, if the surface roughness Rz of the entire surface layer 16 exceeds 26 μm, the surface roughness Rz is excessively large, making discharge difficult, and black spots (fogging) sometimes cannot be suppressed in the image after durability testing. From this viewpoint, the surface roughness Rz is more preferably 25 μm or less, even more preferably 20 μm or less.

The surface roughness Rz is a ten-point average roughness, and is an average value of values measured at five arbitrary points in accordance with JIS B0601 (1994). The surface roughness Rz of the entire surface layer 16 can be measured by observation using a laser microscope (such as "VK-9510" manufactured by Keyence). In an image captured at 400× magnification, a value calculated in a surface roughness mode of an analysis program (program name: KEYENCE VK Analyzer analysis application) can be used as the surface roughness Rz of the entire surface layer 16. The surface roughness Rz of the surface layer 16 in an area on the groove 22 can be measured by observation using a laser microscope (such as "VK-9510" manufactured by Keyence). In an image captured, a value calculated by selecting 0.01 $mm^2$ of the groove in the surface roughness mode of the analysis program (program name: KEYENCE VK Analyzer analysis application) can be used as the surface roughness Rz of the surface layer 16 in the area on the groove 22.

The surface roughness Rz of the surface layer 16 can be adjusted by adjusting the groove width w1 and the groove depth d of the groove 22, the width w2 of the planar part 24, the particle diameter of the roughness forming particles 18, the thickness of the binder polymer 16*a*, and so on.

As the roughness forming particles 18, particles used as the roughness forming particles 18 added to the surface layer 16 of the charging roll, such as resin particles and inorganic particles, can be used. A material of the roughness forming particles 18 is not particularly limited. The material of the roughness forming particles 18 is preferably any one of polyurethane, polyamide, and acrylic resin. When the material of the roughness forming particles 18 is any one of polyurethane, polyamide, and acrylic resin, since the roughness forming particles 18 are composed of a material having a high dielectric constant, charging properties of a roll surface are improved.

A size of the roughness forming particles 18 is not particularly limited. From the viewpoint of being capable of forming appropriate irregularities, improving the uniformity in discharge properties or the like, the roughness forming particles 18 have an average particle diameter of preferably 3 μm or more and 30 μm or less. The average particle diameter is more preferably 5 μm or more and 30 μm or less, even more preferably 10 μm or more and 30 μm or less. The average particle diameter of the roughness forming particles 18 is represented by an average of 20 arbitrary points obtained by observing the surface of the surface layer 16 with a laser microscope and taking, as a particle diameter, a diameter of the roughness forming particles 18 visible during surface observation.

The roughness forming particles 18 may be composed of a single type of particle or two or more types of particles. The expression "a single type of particle" refers to, firstly, particles of the same material. The expression "of the same material" refers to the following. Among particles made of a polymer, for example, those included in polyurethane may be said to be the same in a broad sense, and those having the same monomer composition may be said to be the same in a narrow sense. More preferably, those having the same monomer composition may be taken as the same in a narrow sense. The expression "a single type of particle" refers to, secondly, particles having the same particle diameter. The expression "having the same particle diameter" refers to having a uniform particle diameter. For example, with respect to 50 arbitrary positions, the diameter of the roughness forming particles 18 is measured, an average thereof is taken as μ, a deviation thereof is taken as σ, and μ/σ is 4.97 or less. The diameter of the roughness forming particles 18 can be measured by observing the diameter of the particles using a laser microscope (such as "VK-9510" manufactured by Keyence).

The roughness forming particles 18 may be preferably composed of a single type of particle. If the roughness forming particles 18 are composed of two or more types of particles of different materials or particle diameters, it is necessary to adjust the thickness of the binder polymer 16*a* covering the roughness forming particles 18 in further consideration of a difference in effects on discharge properties due to the materials or particle diameters of the roughness forming particles 18. If the roughness forming particles 18 are composed of a single type of particle in terms of material or particle diameter, it is easy to adjust the thickness of the binder polymer 16*a* covering the roughness forming particles 18. Accordingly, the uniformity in discharge properties can be improved. In the case where two types of particles of significantly different particle diameters are included, the particles of different sizes are likely to aggregate, and dispersibility is likely to deteriorate. If the roughness forming particles 18 are composed of a single type of particle in terms of particle diameter, since it is easy to control aggregation of the roughness forming particles 18, the uniformity in surface roughness can be improved. If the roughness forming particles 18 are composed of a single type of particle in terms of particle diameter, since an irregular shape of the elastic body layer 14 is likely to be reflected on the surface irregularities of the charging roll, it is easy to control the surface irregularities of the charging roll.

In the surface layer 16, the thickness of the binder polymer 16*a* is preferably a predetermined thickness. A thickness t1 of the binder polymer 16*a* covering the roughness forming particles 18 on the groove 22 is preferably larger than a thickness t2 of the binder polymer 16*a* covering the roughness forming particles 18 on the planar part 24. Accordingly, a discharge amount on the roughness forming particle 18 on the groove 22 and a discharge amount on the roughness forming particles 18 on the planar part 24 are adjusted to be the same, and the uniformity in discharge properties can be improved. Accordingly, the generation of an image with black spots can be suppressed. A reason is as follows. A portion where the roughness forming particles 18 are present on the planar part 24 is inferior to a portion where the roughness forming particles 18 are present on the groove 22 in terms of discharge amount due to contact with the photoreceptor, and to make the discharge amount the same at each position, it is necessary to reduce the film thickness of the portion where the roughness forming particles 18 are present on the planar part 24 to be less than the film thickness of the portion where the roughness forming particles 18 are present on the groove 22 and increase the capacitance, and to increase the amount of charge on the surface.

A difference (t1−t2) between the thickness t1 of the binder polymer 16*a* covering the roughness forming particles 18 on the groove 22 and the thickness t2 of the binder polymer 16*a* covering the roughness forming particles 18 on the planar part 24 is preferably 4 μm or more and 16 μm or less. When the thickness difference (t1−t2) is 4 μm or more, the amount of charge on the surface of the binder polymer 16*a* covering the roughness forming particles 18 on the plane part 24 is relatively large, and a range of environment in which an image with black spots is not generated is widened. From this viewpoint, the thickness difference (t1−t2) is more preferably 5 μm or more, even more preferably 6 μm or more. When the thickness difference (t1−t2) is 16 μm or less, since an appropriate thickness is maintained, appropriate irregularities are likely to be formed. Accordingly, the uniformity in discharge properties can be improved. From this viewpoint, the thickness difference (t1−t2) is more preferably 15 μm or less, even more preferably 12 μm or less.

The thickness t1 of the binder polymer 16*a* covering the roughness forming particles 18 on the groove 22 is preferably 5 μm or more and 20 μm or less. When the thickness t1 is 5 μm or more, the resistance at discharge locations is likely to be uniform, and the discharge properties are likely to be uniform. From this viewpoint, the thickness t1 is more preferably 6 μm or more, even more preferably 7 μm or more. When the thickness t1 is 20 μm or less, an appropriate roughness can be ensured on the surface of the surface layer 16 on the groove 22, and a discharge area can be ensured. From this viewpoint, the thickness t1 is more preferably 18 μm or less, even more preferably 15 μm or less.

The thickness t2 of the binder polymer 16*a* covering the roughness forming particles 18 on the planar part 24 is preferably 1.0 μm or more and 4.0 μm or less. When the thickness t2 is 1.0 μm or more, the resistance at discharge locations is likely to be uniform, and the discharge properties are likely to be uniform. From this viewpoint, the thickness t2 is more preferably 1.5 μm or more, even more preferably 2.0 μm or more. When the thickness t2 is 4.0 μm or less, an appropriate roughness can be ensured on the surface of the surface layer 16, and a discharge area can be ensured. From this viewpoint, the thickness t2 is more preferably 3.5 μm or less, even more preferably 3.0 μm or less.

The thicknesses t1 and t2 of the binder polymer 16*a* can be measured by observing a cross section using a laser microscope (such as "VK-9510" manufactured by Keyence). For example, with respect to five arbitrary positions in the binder polymer 16*a* covering the roughness forming particles 18 on the groove 22, the thickness of the binder polymer 16*a* can be measured, and t1 can be represented by an average thereof. With respect to five arbitrary positions in the binder polymer 16*a* covering the roughness forming particles 18 on the planar part 24, the thickness of the binder polymer 16*a* can be measured, and t2 can be represented by an average thereof.

To increase the thickness t1 of the binder polymer 16*a* covering the roughness forming particles 18 on the groove 22 to be larger than the thickness t2 of the binder polymer 16*a* covering the roughness forming particles 18 on the planar part 24, both surface energy instability of the roughness forming particles 18 on the groove 22 and energy instability of base rubber of the groove 22 may be utilized. That is, it is possible to exploit the facts that the roughness forming particles 18 on the groove 22 tend to stabilize by being covered with a large amount of the binder polymer 16*a*, and that the base rubber of the groove 22 tends to stabilize by being covered with a large amount of the binder polymer 16*a*.

The content of the roughness forming particles 18 in the surface layer 16 is not particularly limited. From the viewpoint of improving the dispersibility of the roughness forming particles 18 and easily ensuring uniform charging properties, the content of the roughness forming particles 18 is preferably 3 parts by mass or more and 50 parts by mass or less with respect to 100 parts by mass of the binder polymer 16*a* in the surface layer 16. The content of the roughness forming particles 18 is more preferably 5 parts by mass or more and 30 parts by mass or less.

A conductive agent can be blended into the surface layer 16 to impart conductivity. Examples of the conductive agent include an electronic conductive agent and an ionic conductive agent. Examples of the electronic conductive agent include carbon black, graphite, and conductive metal oxide. Examples of the conductive metal oxide include conductive titanium oxide, conductive zinc oxide, and conductive tin oxide. Examples of the ionic conductive agent include quaternary ammonium salt, borate, and a surfactant. Various additives may be appropriately added to the surface layer 16 as needed. Examples of the additives include a plasticizer, a leveling agent, a filler, a vulcanization accelerator, a processing aid, and a mold release agent.

From the viewpoint of charging properties or the like, the volume resistivity of the surface layer 16 may be set to a semi-conductive region. Specifically, for example, the volume resistivity of the surface layer 16 may be set within a range of $1.0\times10^{7}$ to $1.0\times10^{10}$ Ω·cm. The volume resistivity can be measured in accordance with JIS K6911.

The clastic body layer 14 can be formed, for example, as follows. First, the shaft body 12 is coaxially installed in a hollow part of a roll molding die. An uncrosslinked conductive rubber composition is injected therein, heated, and cured (crosslinked), followed by demolding, or extrusion molding of the uncrosslinked conductive rubber composition onto a surface of the shaft 12, thereby forming the elastic body layer 14 on an outer periphery of the shaft body 12.

Examples of a method for forming the groove 22 on the outer peripheral surface of the clastic body layer 14 include polishing and molding. In either method, regular grooves 22 can be formed on the outer peripheral surface of the elastic body layer 14. In the case of polishing, to form the groove 22 that circles around, a plunge method may be performed. To form the groove 22 in a spiral shape, a traverse method may be performed. In the traverse method, for example, while rotating a roll body including the clastic body layer 14 at a constant speed about an axis, by moving a grindstone in contact with the outer peripheral surface of the elastic body layer 14 at a constant speed in one axial direction, the groove 22 can be formed that draws a regular spiral along the axial direction on the outer peripheral surface of the clastic body layer 14.

The surface layer 16 can be formed by coating a formation material of the surface layer 16 on the outer peripheral surface of the clastic body layer 14, and appropriately performing a drying treatment or the like. The formation material of the surface layer 16 may contain a diluent solvent. Examples of the diluent solvent include a ketone-based solvent such as methyl ethyl ketone (MEK) and methyl isobutyl ketone, an alcohol-based solvent such as isopropyl alcohol (IPA), methanol, and ethanol, a hydrocarbon-based solvent such as hexane and toluene, an acetic acid-based solvent such as ethyl acetate and butyl acetate, an ether-based solvent such as diethyl ether and tetrahydrofuran, and water.

According to the charging roll 10 of the above configuration, one or two or more grooves 22 extending in the direction within ±46° relative to the circumferential direction are regularly formed in the axial direction on the outer peripheral surface of the elastic body layer 14. The groove width w1 and the groove depth d of the groove 22 as well as the width w2 of the planar part 24 are within specific ranges. A specific relationship is present between the angle θ of the direction in which the groove 22 extends relative to the circumferential direction and the ratio w2/w1 of the groove width w1 of the groove 22 to the width w2 of the planar part 24. Thus, the roughness forming particles 18 can be uniformly and balancedly arranged on both the planar part 24 and the groove 22 of the clastic body layer 14. An appropriate surface roughness is formed, an appropriate roughness difference is formed between on the planar part 24 and on the groove 22 of the elastic body layer 14, and the discharge amount can be adjusted to be appropriate. Hence, excellent uniformity in discharge properties is achieved. Furthermore, since the thickness of the binder polymer 16*a* covering the roughness forming particles 18 on the groove 22 is larger than the thickness of the binder polymer 16*a* covering the roughness forming particles 18 on the planar part 24, a uniform discharge amount can be achieved. Hence, excellent uniformity in discharge properties is achieved.

In the charging roll 10 according to the present disclosure, surface irregularities on the charging roll are not formed by arranging two types of roughness forming particles of different sizes on the outer peripheral surface of an overall flat clastic body layer. Instead, surface irregularities are formed on the charging roll 10 by forming a predetermined irregular shape on the outer peripheral surface of the elastic body layer 14, and arranging the relatively uniform roughness forming particles 18 of a predetermined size thereon. The roughness forming particles 18 are arranged not only on the groove 22 of the elastic body layer 14 but also on the planar part 24. Accordingly, the step difference of the surface irregularities of the clastic body layer 14 is present as surface irregularities of the charging roll 10. When the roughness forming particles 18 are relatively uniform, the surface irregularities of the clastic body layer 14 are relatively likely to be reflected on the surface of the charging roll 10. To arrange the roughness forming particles 18 not only on the groove 22 but also on the planar part 24 of the clastic body layer 14, the groove width w1 of the groove 22 should be neither excessively large nor excessively small relative to the size of the roughness forming particles 18. By setting the groove width w1 of the groove 22 to a predetermined value, the roughness forming particles 18 can reliably be uniformly arranged not only on the groove 22 but also on the planar part 24. Similarly, the width w2 of the planar part 24 should be neither excessively large nor excessively small. To reliably uniformly arrange the roughness forming particles 18 on the planar part 24, it is preferable to have a predetermined area ratio. In the present disclosure, a predetermined irregular shape is formed on the outer peripheral surface of the elastic body layer 14. Accordingly, it is possible to increase the surface area of the outer peripheral surface of the elastic body layer compared to an overall flat elastic body layer. Accordingly, the case of discharge is improved. This effect is demonstrated even if, for example, the groove 22 of the elastic body layer 14 is filled with the binder polymer 16*a* of the surface layer 16. This effect is an unprecedented finding. From this point of view, the configuration of the present disclosure is advantageous.

The direction in which the groove 22 extends is within ±46° relative to the circumferential direction y. Accordingly, during friction between the photoreceptor and the charging roll 10, the edge of the convex part formed by the groove 22 is less likely to receive shear stress in the rotation direction (circumferential direction y) of the charging roll 10, and wear of the convex part is suppressed. Since the difference in charging properties between the concave part and the convex part due to wear of the convex part is suppressed during durability testing, generation of an image with stripes is suppressed. At this time, when either the width of the convex part formed by the groove 22 or the width (groove width) of the groove 22 is excessively large, the charging difference between the convex part and the groove 22 within one rotation of the charging roll 10 is easy to notice, which is susceptible to uneven charging. However, since a ratio of the width of the convex part to the width (groove width) of the groove 22 is set to a specific range, the occurrence of uneven charging is suppressed.

Although an embodiment of the present disclosure has been described above, the present disclosure is by no means limited to the above embodiment, and various modifications can be made without departing from the scope of the present disclosure.

Figure 5:
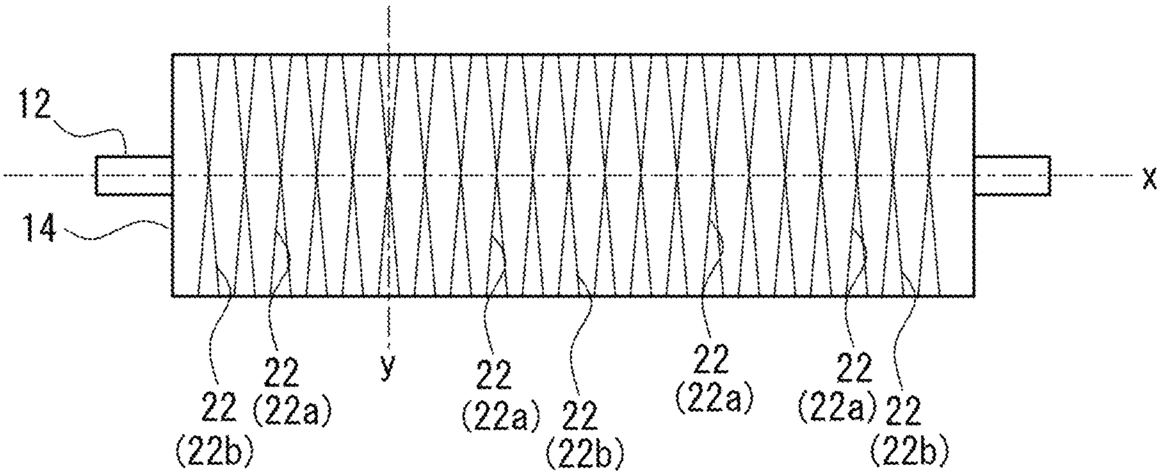
FIG. 5 is a schematic external view of the elastic body layer showing a modification of the shape of the groove formed on the outer peripheral surface of the elastic body layer.

For example, in the above embodiment, one or two or more grooves 22 extending in the direction within ±46° relative to the circumferential direction y are regularly formed in the axial direction x on the outer peripheral surface of the clastic body layer 14. However, as shown in FIG. 5, on the outer peripheral surface of the elastic body layer 14, a mesh-like groove may be formed in which the groove 22 (22*a*) extending in a direction within +46° relative to the circumferential direction y intersects the groove 22 (22*b*) extending in a direction within −46° relative to the circumferential direction y. Accordingly, the uniformity in surface roughness can be improved, and the uniformity in discharge properties can be improved.

With respect to the groove 22 that has a spiral shape, it may only include grooves regularly drawing a left-handed screw-like spiral along the axial direction, or may only include grooves regularly drawing a right-handed screw-like spiral along the axial direction, or a mesh-like groove may be formed in which a groove regularly drawing a right-handed screw-like spiral along the axial direction intersects a groove regularly drawing a left-handed screw-like spiral along the axial direction.

The mesh-like groove including intersecting spirals can be formed, for example, as follows. The above grindstone is moved in one axial direction and then moved in the other axial direction, thereby forming on the outer peripheral surface of the elastic body layer 14 a mesh-like groove 22 in which the groove 22*a* regularly drawing a right-handed screw-like spiral along the axial direction intersects the groove 22*b* regularly drawing a left-handed screw-like spiral along the axial direction.

EXAMPLES

Hereinafter, the present disclosure is described in detail by way of examples and comparative examples.

Example 1

<Preparation of Conductive Rubber Composition>

100 parts by mass of isoprene rubber were blended with 30 parts by mass of carbon black, 6 parts by mass of zinc oxide, 2 parts by mass of stearic acid, 1 part by mass of sulfur, 0.5 part by mass of a thiazole-based vulcanization accelerator, 0.5 part by mass of a thiuram-based vulcanization accelerator, and 50 parts by mass of heavy calcium carbonate. The mixture was subjected to kneading for 10 minutes using a closed mixer adjusted to a temperature of 50° C. to prepare a conductive rubber composition.

The following materials were prepared as materials of the conductive rubber composition.

Isoprene rubber (IR): "JSR IR2200" manufactured by JSR

Carbon black: "Sho Black N762" manufactured by Cabot Japan

Zinc oxide: "Zinc Oxide No. 2" manufactured by Sakai Chemical Industry

Stearic acid: "Stearic Acid Sakura" manufactured by NOF Corporation

Sulfur: "Powdered Sulfur" manufactured by Tsurumi Chemical Industry

Thiazole-based vulcanization accelerator: "Nocceler DM" manufactured by Ouchi Shinko Chemical Industrial Thiuram-based vulcanization accelerator: "Nocceler TRA" manufactured by Ouchi Shinko Chemical Industrial Heavy calcium carbonate: "Whiton B" manufactured by Shiraishi Calcium, having an average particle diameter of 3.6 μm <Fabrication of Elastic Body Layer>

A cored bar (having a diameter of 8 mm) was set in a molding die (pipe-shaped). The above composition was injected therein, and the resultant was heated at 180° C. for 30 minutes, followed by cooling and demolding to form an elastic body layer composed of a conductive rubber elastic body having a thickness of 1.9 mm on an outer periphery of the cored bar. Next, while a roll body having an elastic body layer is rotated at a constant speed about an axis, a grindstone in contact with an outer peripheral surface of the elastic body layer was moved at a constant speed in one axial direction. Subsequently, the grindstone in contact with the outer peripheral surface of the elastic body layer was moved at a constant speed in the other axial direction, thereby forming on the outer peripheral surface of the elastic body layer a mesh-like groove in which a groove regularly drawing a right-handed screw-like spiral along the axial direction intersects a groove regularly drawing a left-handed screw-like spiral along the axial direction. The conditions were as follows.

Rotation speed of roll body: 500 rpm
Moving speed of grindstone: 0.05 m/s
Peripheral speed of grindstone: 72 m/s
Grindstone grain size: #1500
Groove pitch: 0.3 mm <Fabrication of Surface Layer>

Roughness forming particles, a binder polymer, and carbon black as a conductive agent were blended to have a composition (parts by mass) described in the table, 200 parts by mass of methyl ethyl ketone (MEK) were added therein, and the resultant was mixed and stirred at a predetermined agitation speed, thereby preparing a liquid composition for forming a surface layer. Next, while the stirring was continued, the liquid composition was roll-coated onto the outer peripheral surface of the elastic body layer and heat-treated, thereby forming a surface layer having a thickness of 1.0 μm on the outer periphery of the elastic body layer. Accordingly, a charging roll of Example 1 was fabricated.

Example 2

<Preparation of Conductive Rubber Composition>

100 parts by mass of NBR were blended with 0.7 part by mass of stearic acid, 5 parts by mass of zinc oxide, 2 parts by mass of hydrotalcite, 3 parts by mass of a peroxide crosslinking agent, and 20 parts by mass of carbon. The above were stirred and mixed using an agitator to prepare a conductive rubber composition.

The following materials were prepared as materials of the conductive rubber composition.

NBR: "Nipol 1041" manufactured by Zeon Corporation
Stearic acid: "Stearic Acid Sakura" manufactured by NOF Corporation
Zinc oxide: "Zinc Oxide No. 2" manufactured by Sakai Chemical Industry
Hydrotalcite: "DHT-4A" manufactured by Kyowa Chemical Industry
Peroxide crosslinking agent: "Percumyl D40" manufactured by NOF Corporation
Carbon: "Ketjenblack EC300J" manufactured by Ketjenblack International <Fabrication of Elastic Body Layer>

The heating temperature was changed to 170° C., and an elastic body layer composed of a conductive rubber elastic body was formed in the same manner as in Example 1. Next, in the same manner as in Example 1, a mesh-like groove was formed on the outer peripheral surface of the elastic body layer by polishing.

<Fabrication of Surface Layer>

A surface layer having a thickness of 1.0 μm was formed on the outer periphery of the elastic body layer in the same manner as in Example 1. Accordingly, a charging roll of Example 2 was fabricated.

Example 3

<Preparation of Conductive Rubber Composition>

With respect to 100 parts by mass of epichlorohydrin rubber, 5 parts by mass of a vulcanization aid, 10 parts by mass of carbon, 0.5 part by mass of a vulcanization accelerator, 2 parts by mass of sulfur, and 50 parts by mass of a filler were added. The above were stirred and mixed using an agitator to prepare a conductive rubber composition.

The following materials were prepared as materials of the conductive rubber composition.

Epichlorohydrin rubber (ECO, "Hydrin H1100" manufactured by Zeon Corporation)
Vulcanization aid (zinc oxide, "Zinc Oxide No. 2" manufactured by Mitsui Mining & Smelting)
Carbon ("Ketjenblack EC300J" manufactured by Ketjenblack International)
Vulcanization accelerator (2-mercaptobenzothiazole, "Nocceler M-P" manufactured by Ouchi Shinko Chemical Industrial)
Sulfur ("Sulfax PTC" manufactured by Tsurumi Chemical Industry)
Filler (calcium carbonate, "Hakuenka CC" manufactured by Shiraishi Kogyo)

<Fabrication of Elastic Body Layer>

An elastic body layer composed of a conductive rubber elastic body was formed in the same manner as in Example 1. Next, in the same manner as in Example 1, a mesh-like groove was formed on the outer peripheral surface of the elastic body layer by polishing.

<Fabrication of Surface Layer>

A surface layer having a thickness of 1.0 μm was formed on the outer periphery of the elastic body layer in the same manner as in Example 1. Accordingly, a charging roll of Example 3 was fabricated.

Examples 4, 5, 7, and 8

A charging roll of each of Examples 4, 5, 7, and 8 was fabricated in the same manner as in Example 3 except that the surface layer materials were changed.

Example 6

On the outer peripheral surface of the elastic body layer, a groove was formed regularly drawing a left-handed screw-like spiral along the axial direction, and a charging roll of Example 6 was fabricated in the same manner as in Example 3.

Example 9

A charging roll of Example 9 was fabricated in the same manner as in Example 4 except that the formation direction of the groove was set to the circumferential direction.

Example 10

A charging roll of Example 10 was fabricated in the same manner as in Example 4 except that the formation angle of the groove was changed.

Example 11

A charging roll of Example 11 was fabricated in the same manner as in Example 6 except that the formation angle of the groove was changed.

Examples 12 to 15

A charging roll was fabricated in the same manner as in Examples 9 and 10 except that the ratio (w2/w1) of groove width of the groove to width of the planar part was changed.

Examples 16 to 23

A charging roll was fabricated in the same manner as in Example 10 except that the ratio (w2/w1) of groove width of the groove to width of the planar part and the formation angle of the groove were changed.

Comparative Examples 1 to 6

A charging roll was fabricated in the same manner as in Example 4 except that the groove width of the groove, the groove depth of the groove, or the width of the planar part was changed.

Comparative Examples 7 to 14

A charging roll was fabricated in the same manner as in Examples 16 to 23 except that the ratio (w2/w1) of groove width of the groove to width of the planar part was changed.

Comparative Example 15

A charging roll was fabricated in the same manner as in Example 23 except that the formation angle of the groove was changed.

The materials used as the surface layer materials were as follows.

Binder polymer (PA): "Fine Resin FR-101" manufactured by Namariichi

Binder polymer (PU): "ART Resin UN-333" manufactured by Negami Chemical Industrial Roughness forming particles (PU): "Art Pearl C-1000 Transparent" manufactured by Negami Chemical Industrial, having an average particle diameter of 3 μm Roughness forming particles (PU): "Art Pearl C-200 Transparent Classified Product" manufactured by Negami Chemical Industrial, having an average particle diameter of 30 μm Roughness forming particles (PU): "Art Pearl C-300 Transparent" manufactured by Negami Chemical Industrial, having an average particle diameter of 22 μm Roughness forming particles (PU): "Art Pearl C-300 Transparent Classified Product" manufactured by Negami Chemical Industrial, having an average particle diameter of 20 μm Roughness forming particles (PU): "Art Pearl C-400 Transparent" manufactured by Negami Chemical Industrial, having an average particle diameter of 15 μm Roughness forming particles (PU): "Art Pearl C-600 Transparent" manufactured by Negami Chemical Industrial, having an average particle diameter of 11 μm Roughness forming particles (PA): "TR-2" manufactured by Toray, having an average particle diameter of 22 μm Roughness forming particles (PMMA): "Art Pearl GR-200 Transparent" manufactured by Negami Chemical Industrial, having an average particle diameter of 20 μm Carbon black: "Seast 9H" manufactured by Tokai Carbon Surface analysis and cross-sectional analysis of the polished elastic body layer of the charging roll were performed, and the groove width of the groove, the groove depth of the groove, the width of the planar part, and the angle of the groove were calculated. With respect to the fabricated charging roll, the surface roughness Rz and the thickness of the binder polymer of the surface layer were measured. The following evaluations were performed.

(Irregular Shape of Elastic Body Layer)

The groove width of the groove was calculated from the average of the groove widths of 100 arbitrary grooves observed in an image captured by photographing the outer peripheral surface of the elastic body layer using a laser microscope. The groove depth of the groove was calculated from the average of the groove depths of 100 arbitrary grooves observed in an image captured by photographing a cross section in the radial direction of the elastic body layer using a laser microscope. The width of the planar part was calculated from the average of the widths of 100 arbitrary planar parts observed in an image captured by photographing the outer peripheral surface of the elastic body layer using a laser microscope. The angle of the groove was calculated from the average of the angles relative to the circumferential direction of 100 arbitrary grooves observed in an image captured by photographing the outer peripheral surface of the elastic body layer using a laser microscope.

(Surface Roughness Rz)

The surface roughness Rz is a ten-point average roughness, and is an average value of values measured at five arbitrary points in accordance with JIS B0601 (1994). The surface roughness Rz of the entire surface layer was measured by observation using a laser microscope ("VK-9510" manufactured by Keyence). In an image captured at 400× magnification, a value calculated in a surface roughness mode of an analysis program (program name: KEYENCE VK Analyzer analysis application) was used as the surface roughness Rz of the entire surface layer. The surface roughness Rz of the surface layer in an area on the groove was measured by observation using a laser microscope ("VK-9510" manufactured by Keyence). In an image captured, a value calculated by selecting 0.01 $mm^2$ of the groove in the surface roughness mode of the analysis program (program name: KEYENCE VK Analyzer analysis application) was used as the surface roughness Rz of the groove.

(Binder Thickness)

A measurement was performed by observing a cross section in the radial direction of the surface layer at 400× magnification using a laser microscope ("VK-X100" manufactured by Keyence). As shown in FIG. 4, a thickness (binder thickness t1) of the binder polymer covering the roughness forming particles on the groove and a thickness (binder thickness t2) of the binder polymer covering the roughness forming particles on the planar part were measured. The measurement was performed at five arbitrary positions, and the results were each expressed by the average thereof.

(Image Evaluation: Unevenness)

The fabricated charging roll was attached to a unit (black) of an actual machine ("IM C8000" manufactured by RICOH), an image was produced with 25% density halftone in an environment of 10° C. and 10% RH, and evaluation was performed after durability testing using 1,000,000 sheets. An image with no unevenness was evaluated as good "o", and an image with unevenness was evaluated as poor (Image Evaluation: Horizontal Stripes)

The fabricated charging roll was attached to a unit (black) of an actual machine ("IM C8000" manufactured by RICOH), an image was produced with 25% density halftone in an environment of 10° C. and 10% RH, and evaluation was performed after durability testing using 1,000,000 sheets. An image with no horizontal stripes was evaluated as particularly good "o", and an image with horizontal stripes that significantly affect the image was evaluated as poor "×".

(Image Evaluation: Black Spots (Fogging))

The fabricated charging roll was attached to a unit (black) of an actual machine ("IM C8000" manufactured by RICOH), an image was produced with 25% density halftone in an environment of 10° C. and 10% RH, and evaluation was performed after durability testing using 1,000,000 sheets. An image with no black spots was evaluated as good "o", and an image with even one black spot found was evaluated as poor "×".

(Image Evaluation: Vertical Stripes)

The fabricated charging roll was attached to a unit (black) of an actual machine ("IM C8000" manufactured by RICOH), an image was produced with 25% density halftone in an environment of 10° C. and 10% RH, and evaluation was performed after durability testing using 1,000,000 sheets. An image with no vertical stripes was evaluated as good "o", and an image with vertical stripes that significantly affect the image was evaluated as poor "×".

(Image Evaluation: Stripes Following Irregular Shape)

The fabricated charging roll was attached to a unit (black) of an actual machine ("IM C8000" manufactured by RICOH), an image was produced with 25% density halftone in an environment of 10° C. and 10% RH, and evaluation was performed after durability testing using 1,000,000 sheets. An image with no stripes following the irregular shape was evaluated as good "o", and an image with stripes following the irregular shape that significantly affect the image was evaluated as poor "×".

TABLE 1

| | | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Elastic body layer | Polymer material | IR | NBR | ECO | ECO | ECO | ECO | ECO | ECO | ECO | ECO | ECO |
| | Groove width (μm) | 4 | 30 | 23 | 23 | 30 | 23 | 23 | 23 | 23 | 23 | 23 |
| | Groove depth (μm) | 2 | 12 | 8 | 8 | 8 | 8 | 8 | 8 | 8 | 8 | 8 |
| | Width of planar part (μm) | 4 | 30 | 23 | 23 | 30 | 23 | 23 | 23 | 23 | 23 | 23 |
| | Width ratio (planar part/groove) | 1.0 | 1.0 | 1.0 | 1.0 | 1.0 | 1.0 | 1.0 | 1.0 | 1.0 | 1.0 | 1.0 |
| | Irregular shape | Mesh-like | Mesh-like | Mesh-like | Mesh-like | Mesh-like | Spiral | Mesh-like | Mesh-like | Circle around | Mesh-like | Spiral |
| | Groove angle (relative to circumferential direction) | 2° | 2° | 2° | 2° | 2° | 2° | 2° | 2° | 0° | 5° | 5° |
| Surface layer | Binder material | PA | PU | PA | PU | PU | PU | PU | PU | PU | PU | PU |
| | Binder amount (parts by mass) | 100 | 100 | 100 | 100 | 100 | 100 | 100 | 100 | 100 | 100 | 100 |
| | Particle material | PU | PU | PA | PU | PMMA | PU | PU | PU | PU | PU | PU |
| | Particle amount (parts by mass) | 3 | 25 | 25 | 25 | 50 | 25 | 25 | 25 | 25 | 25 | 25 |
| | Number average particle diameter (μm) | 3 | 30 | 22 | 22 | 20 | 22 | 22 | 22 | 22 | 22 | 22 |
| | Carbon black | 50 | 50 | 50 | 50 | 50 | 50 | 50 | 50 | 50 | 50 | 50 |
| | Roughness Rz: entirety (μm) | 5 | 26 | 16 | 16 | 16 | 16 | 16 | 16 | 16 | 16 | 16 |
| | Roughness Rz: groove (μm) | 2 | 16 | 10 | 10 | 10 | 10 | 10 | 10 | 10 | 10 | 10 |
| | Binder thickness: on particles of planar part (μm) | 2.5 | 1.0 | 2.5 | 2.5 | 4.0 | 2.5 | 0.8 | 4.4 | 2.5 | 2.5 | 2.5 |
| | Binder thickness: on particles of groove (μm) | 10 | 5 | 10 | 10 | 20 | 10 | 4 | 23 | 10 | 10 | 10 |
| Image evaluation | Unevenness after durability testing | | | | | | | | | | | |
| | Horizontal stripes after durability testing | ○ | ○ | ○ | ○ | ○ | ○ | ○ | ○ | ○ | ○ | ○ |
| | Black spots (fogging) after durability testing | ○ | ○ | ○ | ○ | ○ | ○ | ○ | ○ | ○ | ○ | ○ |
| | Vertical stripes after durability testing | ○ | ○ | ○ | ○ | ○ | ○ | ○ | ○ | ○ | ○ | ○ |
| | Stripes (following irregular shape) after durability testing | ○ | ○ | ○ | ○ | ○ | ○ | ○ | ○ | ○ | ○ | ○ |

TABLE 2

| | | Example | | | | | | | | | | | |
|---|---|---|---|---|---|---|---|---|---|---|---|---|---|
| | | 12 | 13 | 14 | 15 | 16 | 17 | 18 | 19 | 20 | 21 | 22 | 23 |
| Elastic body layer | Polymer material | ECO | ECO | ECO | ECO | ECO | ECO | ECO | ECO | ECO | ECO | ECO | ECO |
| | Groove width (μm) | 23 | 30 | 23 | 30 | 23 | 15 | 23 | 15 | 25 | 11.6 | 25 | 11.6 |
| | Groove depth (μm) | 8 | 8 | 8 | 8 | 8 | 8 | 8 | 8 | 8 | 8 | 8 | 8 |
| | Width of planar part (μm) | 1.3 | 0.7 | 1.3 | 0.7 | 1.0 | 2.0 | 1.0 | 2.0 | 1.2 | 2.6 | 1.2 | 2.6 |
| | Width ratio (planar part/groove) | 30 | 21 | 30 | 21 | 23 | 30 | 23 | 30 | 30 | 30 | 30 | 30 |
| | Irregular shape | Circle around | Circle around | Mesh-like | Mesh-like | Mesh-like | Mesh-like | Mesh-like | Mesh-like | Mesh-like | Mesh-like | Mesh-like | Mesh-like |
| | Groove angle (relative to circumferential direction) | 0° | 0° | 5° | 5° | 5.5° | 5.5° | 22° | 22° | 22.5° | 22.5° | 46° | 46° |
| Surface layer | Binder material | PU | PU | PU | PU | PU | PU | PU | PU | PU | PU | PU | PU |
| | Binder amount (parts by mass) | 100 | 100 | 100 | 100 | 100 | 100 | 100 | 100 | 100 | 100 | 100 | 100 |
| | Particle material | PU | PU | PU | PU | PU | PU | PU | PU | PU | PU | PU | PU |
| | Particle amount (parts by mass) | 25 | 25 | 25 | 25 | 25 | 25 | 25 | 25 | 25 | 25 | 25 | 25 |
| | Number average particle diameter (μm) | 22 | 20 | 22 | 20 | 22 | 15 | 22 | 15 | 22 | 11 | 22 | 11 |
| | Carbon black | 50 | 50 | 50 | 50 | 50 | 50 | 50 | 50 | 50 | 50 | 50 | 50 |
| | Roughness Rz: entirety (μm) | 16 | 16 | 16 | 15 | 16 | 14 | 16 | 14 | 16 | 9 | 16 | 9 |
| | Roughness Rz: groove (μm) | 10 | 10 | 10 | 9 | 10 | 9 | 10 | 9 | 10 | 7 | 10 | 7 |
| | Binder thickness: on particles of planar part (μm) | 2.5 | 2.5 | 2.5 | 2.5 | 2.5 | 2.5 | 2.5 | 2.5 | 2.5 | 2.5 | 2.5 | 2.5 |
| | Binder thickness: on particles of groove (μm) | 10 | 10 | 10 | 10 | 10 | 10 | 10 | 10 | 10 | 10 | 10 | 10 |
| Image evaluation | Unevenness after durability testing | ○ | ○ | ○ | ○ | ○ | ○ | ○ | ○ | ○ | ○ | ○ | ○ |
| | Horizontal stripes after durability testing | ○ | ○ | ○ | ○ | ○ | ○ | ○ | ○ | ○ | ○ | ○ | ○ |
| | Black spots (fogging) after durability testing | ○ | ○ | ○ | ○ | ○ | ○ | ○ | ○ | ○ | ○ | ○ | ○ |
| | Vertical stripes after durability testing | ○ | ○ | ○ | ○ | ○ | ○ | ○ | ○ | ○ | ○ | ○ | ○ |
| | Stripes (following irregular shape) after durability testing | ○ | ○ | ○ | ○ | ○ | ○ | ○ | ○ | ○ | ○ | ○ | ○ |

TABLE 3

| | | Comparative Example | | | | | |
|---|---|---|---|---|---|---|---|
| | | 1 | 2 | 3 | 4 | 5 | 6 |
| Elastic body layer | Polymer material | ECO | ECO | ECO | ECO | ECO | ECO |
| | Groove width (μm) | 3 | 32 | 23 | 23 | 23 | 23 |
| | Groove depth (μm) | 8 | 8 | 1 | 14 | 8 | 8 |
| | Width of planar part (μm) | 3.9 | 23 | 23 | 23 | 3 | 31 |
| | Width ratio (planar part/groove) | 1.3 | 0.7 | 1.0 | 1.0 | 0.1 | 1.3 |
| | Irregular shape | Mesh-like | Mesh-like | Mesh-like | Mesh-like | Mesh-like | Mesh-like |
| | Groove angle (relative to circumferential direction) | 2° | 2° | 2° | 2° | 2° | 2° |
| Surface layer | Binder material | PU | PU | PU | PU | PU | PU |
| | Binder amount (parts by mass) | 100 | 100 | 100 | 100 | 100 | 100 |
| | Particle material | PU | PU | PU | PU | PU | PU |
| | Particle amount (parts by mass) | 25 | 25 | 25 | 25 | 25 | 25 |
| | Number average particle diameter (μm) | 3 | 22 | 3 | 22 | 22 | 22 |
| | Carbon black | 50 | 50 | 50 | 50 | 50 | 50 |

TABLE 3-continued

| | | Comparative Example | | | | | |
|---|---|---|---|---|---|---|---|
| | | 1 | 2 | 3 | 4 | 5 | 6 |
| | Roughness Rz: entirety (μm) | 5 | 16 | 26 | 16 | 16 | 16 |
| | Roughness Rz: groove (μm) | 4 | 10 | 26 | 10 | 10 | 10 |
| | Binder thickness: on particles of planar part (μm) | 2.5 | 2.5 | 2.5 | 2.5 | 2.5 | 2.5 |
| | Binder thickness: on particles of groove (μm) | 10 | 10 | 10 | 10 | 10 | 10 |
| Image evaluation | Unevenness after durability testing | ○ | x | ○ | ○ | x | x |
| | Horizontal stripes after durability testing | x | ○ | x | ○ | ○ | ○ |
| | Black spots (fogging) after durability testing | ○ | ○ | ○ | ○ | ○ | ○ |
| | Vertical stripes after durability testing | ○ | x | ○ | x | ○ | ○ |
| | Stripes (following irregular shape) after durability testing | ○ | ○ | ○ | ○ | ○ | ○ |

TABLE 4

| | | Comparative Example | | | | | | | | |
|---|---|---|---|---|---|---|---|---|---|---|
| | | 7 | 8 | 9 | 10 | 11 | 12 | 13 | 14 | 15 |
| Elastic body layer | Polymer material | ECO | ECO | ECO | ECO | ECO | ECO | ECO | ECO | ECO |
| | Groove width (μm) | 21 | 25 | 21 | 25 | 14 | 25 | 11.5 | 23 | 15 |
| | Groove depth (μm) | 8 | 8 | 8 | 8 | 8 | 8 | 8 | 8 | 8 |
| | Width of planar part (μm) | 30 | 15 | 30 | 15 | 30 | 23 | 30 | 27 | 30 |
| | Width ratio (planar part/groove) | 1.4 | 0.6 | 1.4 | 0.6 | 2.1 | 0.9 | 2.7 | 1.1 | 2.0 |
| | Irregular shape | Circle around | Circle around | Mesh-like | Mesh-like | Mesh-like | Mesh-like | Mesh-like | Mesh-like | Mesh-like |
| | Groove angle (relative to circumferential direction) | 0° | 0° | 5° | 5° | 22° | 22° | 46° | 46° | 47° |
| Surface layer | Binder material | PU | PU | PU | PU | PU | PU | PU | PU | PU |
| | Binder amount (parts by mass) | 100 | 100 | 100 | 100 | 100 | 100 | 100 | 100 | 100 |
| | Particle material | PU | PU | PU | PU | PU | PU | PU | PU | PU |
| | Particle amount (parts by mass) | 25 | 25 | 25 | 25 | 25 | 25 | 25 | 25 | 25 |
| | Number average particle diameter (μm) | 20 | 20 | 20 | 20 | 11 | 22 | 11 | 22 | 11 |
| | Carbon black | 50 | 50 | 50 | 50 | 50 | 50 | 50 | 50 | 50 |
| | Roughness Rz: entirety (μm) | 16 | 16 | 16 | 15 | 9 | 16 | 9 | 16 | 9 |
| | Roughness Rz: groove (μm) | 10 | 10 | 10 | 9 | 7 | 10 | 7 | 10 | 7 |
| | Binder thickness: on particles of planar part (μm) | 2.5 | 2.5 | 2.5 | 2.5 | 2.5 | 2.5 | 2.5 | 2.5 | 2.5 |
| | Binder thickness: on particles of groove (μm) | 10 | 10 | 10 | 10 | 10 | 10 | 10 | 10 | 10 |
| Image evaluation | Unevenness after durability testing | ○ | ○ | ○ | ○ | x | x | x | x | ○ |
| | Horizontal stripes after durability testing | ○ | ○ | ○ | ○ | ○ | ○ | ○ | ○ | ○ |
| | Black spots (fogging) after durability testing | ○ | ○ | ○ | ○ | ○ | ○ | ○ | ○ | ○ |
| | Vertical stripes after durability testing | x | x | x | x | ○ | ○ | ○ | ○ | ○ |
| | Stripes (following irregular shape) after durability testing | ○ | ○ | ○ | ○ | ○ | x | ○ | x | x |

In Comparative Example 1, the groove width was excessively small, and the roughness forming particles did not enter the groove. Hence, a difference between the surface roughness arising from the roughness forming particles on the planar part and the surface roughness arising from the roughness forming particles on the groove was small, and horizontal stripes occurred due to insufficient charging. If roughness forming particles of a size that fits in a small groove width are used, a roughness that ensures sufficient discharge cannot be formed. In Comparative Example 2, the groove width was excessively large, a difference in charging properties between a concave part and a convex part of the charging roll surface was likely to appear in the image, and vertical stripes occurred. The groove width was excessively large, and the roughness forming particles were unable to be uniformly arranged in the groove. Hence, unevenness after durability testing occurred. If roughness forming particles of a size that matches a large groove width are used, a convex part due to the roughness forming particles is excessively large, the surface roughness is excessively large, and an appropriate surface roughness cannot be achieved. Accordingly, uniform discharge properties cannot be achieved. In Comparative Example 2, since the groove width was excessively large, and the binder polymer covering the roughness forming particles on the groove was likely to contact a photoreceptor, not only the binder polymer covering the roughness forming particles on the planar part and the roughness forming particles thereunder but also the binder polymer covering the roughness forming particles on the groove and the roughness forming particles thereunder were worn, the entire surface of the surface layer was worn during durability testing, and unevenness occurred in the image.

In Comparative Example 3, the groove depth was excessively small, the difference between the surface roughness arising from the roughness forming particles on the planar part and the surface roughness arising from the roughness forming particles on the groove was small, and horizontal stripes occurred due to insufficient charging. If small roughness forming particles are used in accordance with a small groove width, a roughness that ensures sufficient discharge cannot be formed. In Comparative Example 4, the groove depth was excessively large, the difference between the surface roughness arising from the roughness forming particles on the planar part and the surface roughness arising from the roughness forming particles on the groove was excessively large, the difference in charging properties increased, and an image defect (vertical stripes) occurred. If large roughness forming particles are used in accordance with a large groove depth, the difference between the surface roughness arising from the roughness forming particles on the planar part and the surface roughness arising from the roughness forming particles on the groove is excessively large, making discharge difficult.

In Comparative Examples 5 and 6, while the groove width w1 of the groove was within an appropriate range (4 to 30 μm), the width w2 of the planar part deviated from the appropriate range (4 to 30 μm). Hence, the uniformity in surface irregularities deteriorated, and an image with unevenness was generated after durability testing.

In Comparative Examples 7 to 10, the groove angle was within ±5° relative to the circumferential direction, and the groove angle was relatively small. In such cases, the ratio (w2/w1) of groove width of the groove to width of the planar part was not within a predetermined range, and either the groove width of the groove or the width of the planar part was excessively large in proportion. Hence, the difference in charging properties between the groove and the planar part was likely to appear in the image, and vertical stripes occurred.

In Comparative Examples 11 to 12, the groove angle was larger than 5° and 22° or less relative to the circumferential direction, and the groove angle was somewhat large. In such cases, the ratio (w2/w1) of groove width of the groove to width of the planar part was not within a predetermined range, and either the groove width of the groove or the width of the planar part was excessively large in proportion. Hence, a charging difference occurred between the groove and the planar part, and an image with unevenness was generated after durability testing. In Comparative Example 12, in the case where the formation angle of the groove was larger than ±5° relative to the circumferential direction, the width of the planar part deviated to be smaller than that of the groove. Hence, due to rotation in the circumferential direction, an edge of the planar part, which was a convex part, was likely to be worn. During durability testing, the difference in charging properties between the concave part and the convex part due to wear of the convex part increased, and an image with stripes that follow the irregular shape was generated.

In Comparative Examples 13 to 14, the groove angle was larger than 22° and 46° or less relative to the circumferential direction, and the groove angle was relatively large. In such cases, the ratio (w2/w1) of groove width of the groove to width of the planar part was not within a predetermined range, and either the groove width of the groove or the width of the planar part was excessively large in proportion. Hence, a charging difference occurred between the groove and the planar part, and an image with unevenness was generated after durability testing. In Comparative Example 14, in the case where the formation angle of the groove was larger than ±5° relative to the circumferential direction, the width of the planar part deviated to be smaller than that of the groove. Hence, due to rotation in the circumferential direction, an edge of the planar part, which was a convex part, was likely to be worn. During durability testing, the difference in charging properties between the concave part and the convex part due to wear of the convex part increased, and an image with stripes that follow the irregular shape was generated.

In Comparative Example 15, the groove angle was larger than 46° relative to the circumferential direction, and the groove angle was excessively large. Hence, due to rotation in the circumferential direction, an edge of a convex part formed by the groove was likely to be worn. During durability testing, the difference in charging properties between the concave part and the convex part due to wear of the convex part increased, and an image with stripes that follow the irregular shape was generated.

On the other hand, in Examples, one or two or more grooves extending in a direction within ±46° relative to the circumferential direction were regularly formed in the axial direction on the outer peripheral surface of the elastic body layer. The groove width and the groove depth of the groove as well as the width of the planar part were within specific ranges. A specific relationship was present between the angle θ of the direction in which the groove extends relative to the circumferential direction and the ratio w2/w1 of the groove width w1 of the groove to the width w2 of the planar part. The surface layer included a binder polymer and roughness forming particles. The roughness forming particles were respectively arranged on the planar part and the groove of the elastic body layer. Hence, in Examples, in the image evaluation, problems such as unevenness after durability testing, horizontal stripes, black spots (fogging), vertical stripes, and stripes following the irregular shape were suppressed, indicating excellent uniformity in discharge properties.

While particular embodiments and examples of the present disclosure have been described above, the present disclosure is not limited to the above embodiments and examples, and various modifications can be made without departing from the spirit of the present disclosure.

What is claimed is:

1. A charging roll for an electrophotographic machine, comprising:

a shaft body;

an elastic body layer, formed on an outer peripheral surface of the shaft body; and a surface layer, formed on an outer peripheral surface of the elastic body layer, wherein at least one groove extending in a direction within ±46° relative to a circumferential direction is regularly formed in an axial direction on the outer peripheral surface of the elastic body layer;

the groove has a groove width w1 of 4 μm or more and 30 μm or less;

the groove has a groove depth of 2 μm or more and 12 μm or less;

a planar part being a portion of the outer peripheral surface of the elastic body layer other than the groove has a width w2 of 4 μm or more and 30 μm or less;

an angle θ of the direction in which the groove extends relative to the circumferential direction and a ratio w2/w1 of the groove width w1 of the groove to the width w2 of the planar part has a relationship represented by relationships (A) to (C) below;

the surface layer comprises a binder polymer and roughness forming particles; and the roughness forming particles are respectively arranged on the planar part and on the groove of the elastic body layer;

$$(A)\ \text{when } -5^\circ \leq \theta \leq +5^\circ,\ 0.7 \leq w2/w1 \leq 1.3;$$

$$(B)\ \text{when } -22^\circ \leq \theta < -5^\circ \text{ or } +5^\circ < \theta \leq +22^\circ,\ 1.0 \leq w2/w1 \leq 2.0;$$

$$(C)\ \text{when } -46^\circ \leq \theta < -22^\circ \text{ or } +22^\circ < \theta \leq +46^\circ,\ 1.2 \leq w2/w1 \leq 2.6.$$

2. The charging roll for an electrophotographic machine according to claim 1, wherein the surface layer in an area on the groove has a surface roughness Rz of 2 μm or more and 16 μm or less, and an entire surface layer has a surface roughness Rz of 5 μm or more and 26 μm or less.

3. The charging roll for an electrophotographic machine according to claim 1, wherein the roughness forming particles have an average particle diameter of 3 μm or more and 30 μm or less.

4. The charging roll for an electrophotographic machine according to claim 1, wherein a material of the roughness forming particles is any one of polyurethane, polyamide, and acrylic resin.

5. The charging roll for an electrophotographic machine according to claim 1, wherein the binder polymer covering the roughness forming particles on the groove has a larger thickness than the binder polymer covering the roughness forming particles on the planar part.

6. The charging roll for an electrophotographic machine according to claim 1, wherein a difference between a thickness of the binder polymer covering the roughness forming particles on the groove and a thickness of the binder polymer covering the roughness forming particles on the planar part is 4 μm or more and 16 μm or less.

7. The charging roll for an electrophotographic machine according to claim 1, wherein the elastic body layer comprises at least one of isoprene rubber, nitrile rubber, and hydrin rubber.

8. The charging roll for an electrophotographic machine according to claim 1, wherein the binder polymer of the surface layer is either polyurethane or polyamide.

9. The charging roll for an electrophotographic machine according to claim 1, wherein the roughness forming particles are composed of a single type of particle.

10. The charging roll for an electrophotographic machine according to claim 1, wherein, on the outer peripheral surface of the elastic body layer, a mesh-like groove is formed in which a groove extending in a direction within +46° relative to the circumferential direction intersects a groove extending in a direction within −46° relative to the circumferential direction.

* * * * *